United States Patent
Mortazavi et al.

(10) Patent No.: US 10,868,486 B2
(45) Date of Patent: Dec. 15, 2020

(54) LOW POWER ADAPTIVE LINEAR RESONANT ACTUATOR DRIVER USING ACCELEROMETER

(71) Applicant: Ambiq Micro, Inc., Austin, TX (US)

(72) Inventors: Yousof Mortazavi, Austin, TX (US); Scott McLean Hanson, Austin, TX (US)

(73) Assignee: AMBIQ MICRO, INC., Austin, TX (US)

( * ) Notice: Subject to any disclaimer, the term of this patent is extended or adjusted under 35 U.S.C. 154(b) by 0 days.

(21) Appl. No.: 16/379,228

(22) Filed: Apr. 9, 2019

(65) Prior Publication Data

US 2020/0328711 A1 Oct. 15, 2020

(51) Int. Cl.
| | | |
|---|---|---|
| *H02P 25/032* | (2016.01) | |
| *H02P 25/06* | (2016.01) | |
| *G01P 15/12* | (2006.01) | |
| *G01P 21/00* | (2006.01) | |
| *H04L 29/08* | (2006.01) | |
| *B06B 1/02* | (2006.01) | |
| *H02K 41/02* | (2006.01) | |
| *G01C 22/00* | (2006.01) | |
| *G06F 3/01* | (2006.01) | |

(52) U.S. Cl.
CPC .......... *H02P 25/032* (2016.02); *B06B 1/0246* (2013.01); *G01C 22/006* (2013.01); *G01P 15/12* (2013.01); *G01P 21/00* (2013.01); *G06F 3/016* (2013.01); *H02K 41/02* (2013.01); *H02P 25/06* (2013.01); *H04L 67/22* (2013.01)

(58) Field of Classification Search
CPC ....... H04L 25/4902; H04L 67/22; H04B 1/04; H02P 1/00; H02P 1/04; H02P 1/46; H02P 23/00; H02P 25/00; H02P 27/00; H02P 27/04; H02P 27/06; H02P 27/08; H02P 6/00; H02P 7/00; H02P 25/032; H02P 25/06; H02P 6/006; H02P 8/005; G05B 11/28; H02K 41/02; G06F 3/016
USPC ....... 388/800, 819; 318/400.01, 400.02, 700, 318/701, 721, 727, 799, 800, 801, 430, 318/114, 119, 135; 375/238
See application file for complete search history.

(56) References Cited

U.S. PATENT DOCUMENTS

| | | | | |
|---|---|---|---|---|
| 9,459,632 | B2 * | 10/2016 | Houston | G05D 19/02 |
| 9,608,848 | B2 * | 3/2017 | Roy | H04L 25/4902 |
| 9,764,357 | B2 * | 9/2017 | Houston | B06B 1/166 |
| 10,564,728 | B1 * | 2/2020 | Vasudevan | G06F 3/016 |
| 10,601,355 | B2 * | 3/2020 | Vasudevan | H02K 29/12 |
| 2013/0307441 | A1 * | 11/2013 | Schuster | B06B 1/023 |
| | | | | 318/127 |
| 2019/0310709 | A1 * | 10/2019 | Yamazaki | G06F 3/03547 |

* cited by examiner

*Primary Examiner* — Antony M Paul
(74) *Attorney, Agent, or Firm* — David R. Stevens; Stevens Law Group

(57) ABSTRACT

An accelerometer and a linear resonant actuator (LRA) are mechanically coupled, such as by being mounted to the same circuit board. The output of the accelerometer is evaluated in order to select a drive frequency for the LRA. For example, the drive frequency may be varied while measuring the magnitude of acceleration induced by the LRA. The output of the accelerometer may further be used to perform a fitness tracking function, such as counting steps or detecting an activity level.

18 Claims, 3 Drawing Sheets

LOW POWER ADAPTIVE LINEAR RESONANT ACTUATOR DRIVER USING ACCELEROMETER

BACKGROUND

Field of the Invention

This invention relates to linear resonant actuators for providing haptic feedback.

Background of the Invention

Linear Resonant Actuator (LRA) vibration motors are a type of motor used in haptic technology to communicate to a user through their sense of touch. Compared to other types of vibration motors, LRAs are relatively small in form factor, power efficient, and quite durable. However, driving LRAs can be complex, especially when operating at or near maximum haptic efficiency (defined as acceleration divided by power). Driving at maximum haptic efficiency requires the electric stimulus to be in tune with the resonance of the electromechanical system.

It would be an advancement in the art to provide a LRA with improved haptic efficiency.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
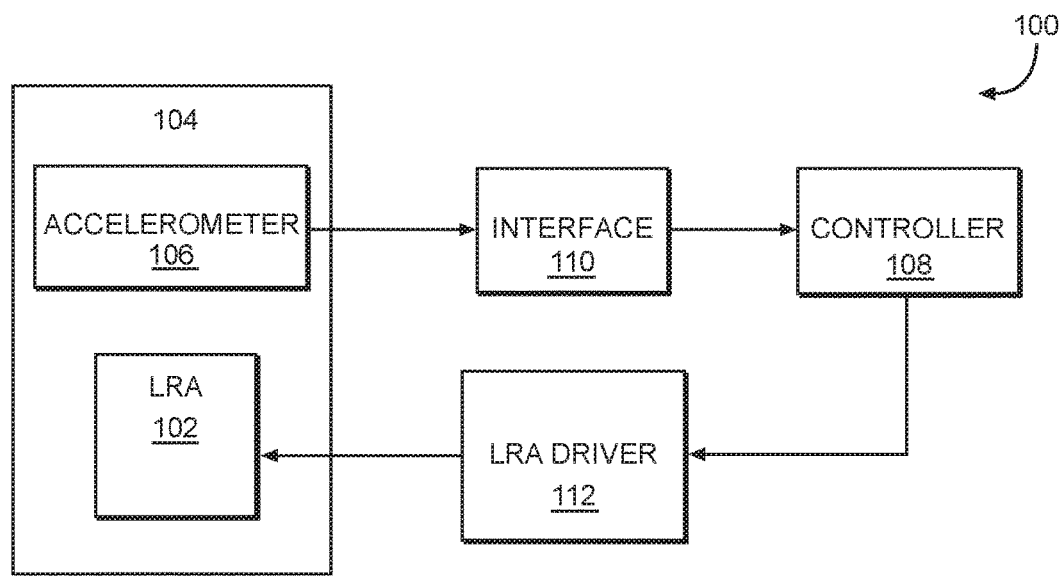
FIG. 1 is a schematic block diagram of components implementing an adaptive LRA driver in accordance with an embodiment of the present invention.

Referring to FIG. 1 a system 100 may be used to operate an LRA 102 in a manner that increases its haptic efficiency relative to alternative approaches. In the illustrated embodiment, the LRA 102 is mounted to a circuit board 104 to which an accelerometer 106 is also mounted. The accelerometer 106 may be a one, two, or three axis accelerometer and may be embodied as multiple different accelerometers. The accelerometer 106 may be implemented using any approach for manufacturing accelerometers known in the art. The accelerometer 106 and LRA 102 are preferably mounted sufficiently proximate to one another that vibration of the LRA 102 is detected by the accelerometer, such as within 0.5 to 5 cm from one another. For example, the accelerometer 106 may be mounted such that the acceleration created by the LRA 102 is attenuated by 10% or less.

Note that the mechanical coupling between the accelerometers 106 and LRA 102 may be achieved by various means, such as a rigid rod or other frame member fastened to both the accelerometer 106 and LRA 102.

The accelerometer 106 may be coupled to a controller 108, such as through an interface 110. The controller 108 may be embodied as a microprocessor, general purpose processor, application specific integrated circuit (ASIC), field-programmable gate array (FPGA), or any other circuit that can be programmed to perform the functions ascribed to the controller 108.

The interface 110 may perform various signal processing functions on an output of the accelerometer 106 and provide a result of these processing functions to the controller 108. For example, the interface 110 may be filter outputs of the accelerometer and sample the filtered outputs to obtain a stream of digital acceleration measurements. The interface 110 may perform other functions such as obtaining a magnitude of acceleration of a specific accelerometer or a total magnitude of acceleration as measured using multiple accelerometers.

The controller 108 selects a drive frequency for the LRA 102 according to the output of the accelerometer 106 as provided by the interface 110. The controller 108 then instructs a LRA driver circuit to generate a drive signal to the LRA 102 at the drive frequency. The manner in which the drive frequency is selected and the drive signal is generated is described below.

Note that in some embodiments, some or all of the controller 108, interface 110, and LRA driver 112 are implemented using the same processing device or by portions of the same processing device residing on the same chip.

Figure 2A:
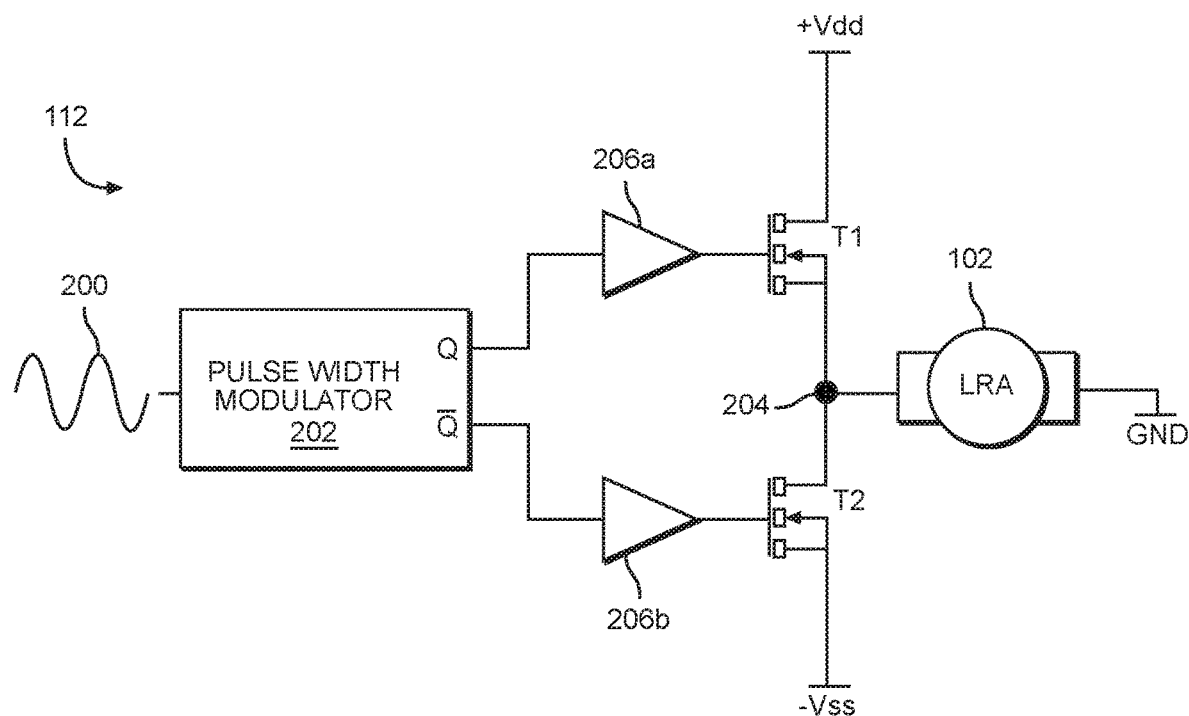
FIG. 2A is a schematic block diagram of a pulse width modulation (PWM) circuit using a half bridge to drive an LRA in accordance with an embodiment of the present invention.

FIG. 2A illustrates an embodiment of an LRA driver 112. In the illustrated embodiment, the controller provides an input 200 to a pulse with modulation (PWM) circuit 202. The input 200 may be in the form of a digital value indicating the drive frequency. The input 200 may also be in the form of a digital or analog sine wave at the desired frequency, which the PWM circuit 202 converts into a stream of pulses.

The manner in which the PWM circuit 202 receives the input 200 and produces a PWM output may be according to any approach known in the art. For example, the PWM output for a desired frequency may be generated using the approach of U.S. application Ser. No. 15/674,242 filed Aug. 1, 2017, and entitled "Counter/Timer Array For Generation Of Complex Patterns Independent Of Software Control," which is hereby incorporated herein by reference in its entirety.

FIG. 2A illustrates an LRA driver 112 embodied as a half-bridge class-D LRA driver implementing two-level PWM. As shown in FIG. 2A, the PWM circuit 202 may be a two level (Q, $\bar{Q}$) PWM circuit 202 driving a half bridge circuit including a transistor T1 coupling a drive voltage Vdd to an input 204 of the LRA 102. The other input of the LRA 102 may be coupled to ground or some other voltage that is different from Vdd. The half bridge circuit further includes a transistor T2 coupling the input 204 to a voltage −Vss, which may be ground, −Vdd, or some other voltage that is different (e.g., lower) than Vdd.

The gates of the transistors T1 and T2 may be driven by drivers 206a, 206b, respectively, coupled to the outputs Q and $\overline{Q}$, respectively, of the PWM circuit 202. The driver 206a, 206b may be embodied as buffers that amplify signals output on Q and $\overline{Q}$ and output the amplified signals to the gates of the transistors T1 and T2, respectively.

Figure 2B:
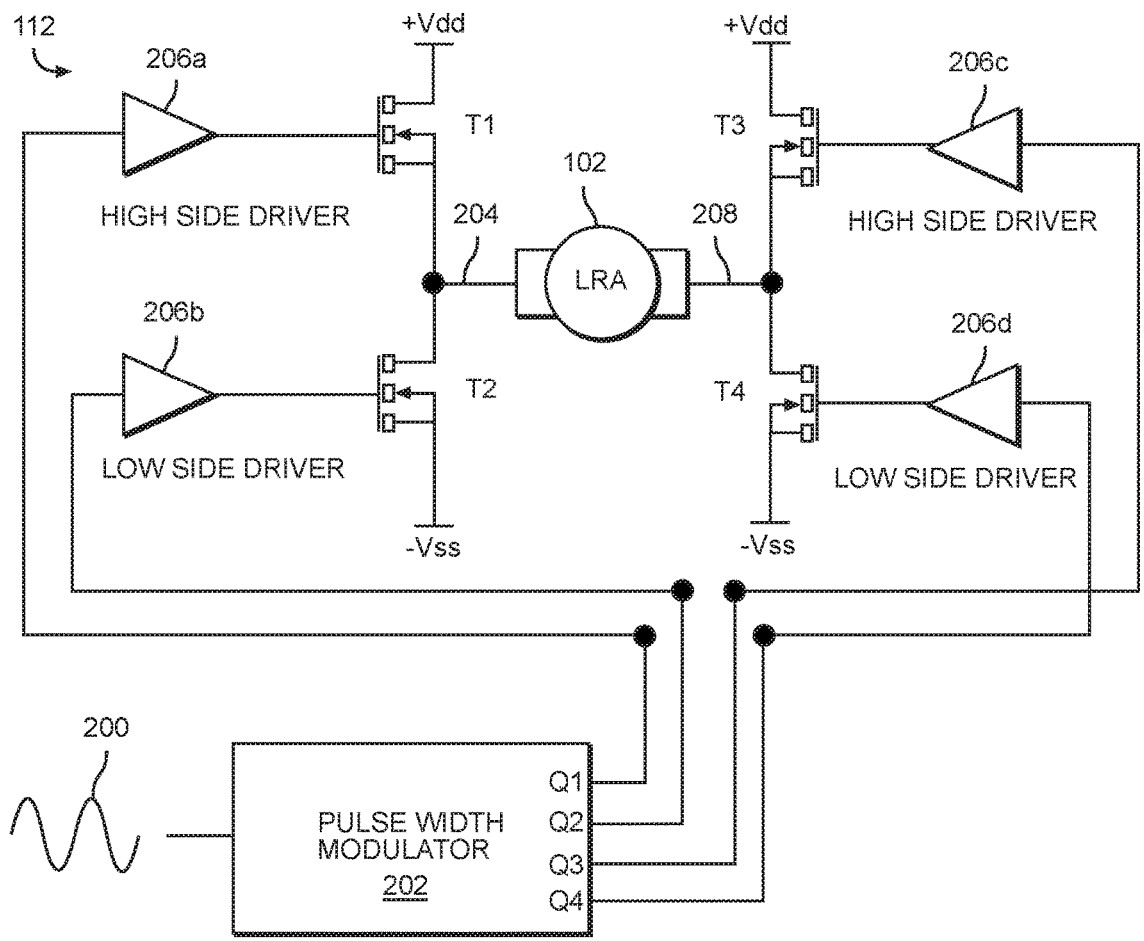
FIG. 2B is a schematic block diagram of a pulse width modulation (PWM) circuit using a full bridge to drive an LRA in accordance with an embodiment of the present invention.
Figure 3:
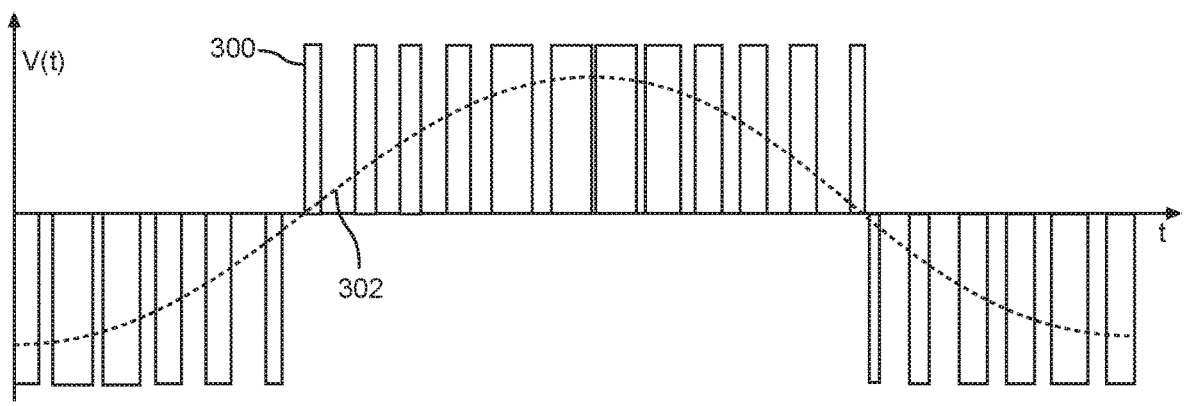
FIG. 3 illustrates a PWM output for inputting to a LRA in accordance with an embodiment of the present invention.

Referring to FIG. 2B, in another embodiment, the LRA driver 112 may be embodied as a full-bridge class-D LRA driver that can produce a three-level PWM signal, as shown in FIG. 3. The LRA driver 112 of FIG. 2B may include a full bridge circuit such that one input 204 of the LRA is coupled to a half bridge circuit as shown with respect to FIG. 2A and the other input 208 of the LRA is coupled to a different half bridge circuit having the identical configuration. In particular, the other half bridge circuit may include a transistor T3 coupling Vdd to the input 208, and a transistor T4 coupling −Vss to the input 208.

Driver 206a couples the gate of transistor T1 to an output Q1 of the pulse width modulator 202. Driver 206b couples the gate of transistor T2 to an output Q2 of the pulse width modulator 202. Driver 206c couples the gate of transistor T3 to an output Q3 of the pulse width modulator 202. Driver 206d couples the gate of transistor T4 to an output Q4 of the pulse width modulator 202.

FIG. 3 shows a plot 300 of the voltage V(t) across the inputs 204, 208 of the LRA 102. The PWM circuit 202 may achieve three different levels as follows:

1. Assert Q1 and Q4, thereby connecting input 204 to Vdd and input 208 to −Vss through transistors T1 and T4.

2. Assert Q2 and Q3, thereby connecting input 204 to −Vss and input 208 to Vdd through transistors Q2 and Q4.

3. Assert either a combination of Q2 and Q4 or a combination of Q1 and Q3 thereby causing no voltage drop across the inputs 204 and 208.

By adjusting the timing and width of the pulses, the PWM circuit 202 provides a signal that, when smoothed by the inherent low-pass filtering properties of the LRA 102 or a low pass filter, will result in an approximately sinusoidal output of the LRA 102. The manner in which these pulses are generated may be according to any approach for implementing PWM as known in the art.

For either of the LRA driver 112 of FIGS. 2A and 2B, the PWM circuit 202 changes state at a frequency that is higher than the sine wave it is approximating, e.g. at least 10 times higher, preferably more than 20 times higher. For example, the PWM circuit 202 may operate at a fixed switching frequency whereas the width of pulses is changed in order to approximate a more complex sine wave.

The LRA 102 includes a coil and other components that have a frequency response much lower than the switching frequency and therefore act as a low pass filter. Accordingly, the LRA converts the pulses output by the LRA driver 112 into a sine wave 302 as shown in FIG. 3. The sine wave 302 shown in FIG. 3 also resembles the amount of current drawn by the LRA in response to the PWM signal.

One method to improve the power efficiency of the LRA 102 is to choose a suitable switching frequency for the PWM circuit 202 to match the characteristics of the LRA 102. If the switching frequency is too low, the low pass filtered-response of the LRA will still contain high frequency switching components, that will lead to excess power that does not get converted into vibrations. Instead, the high frequency switching causes resistive and capacitive losses in the switches and the LRA 102. In prior approaches, LRA drivers usually operate at a constant switching frequency with little control to optimize the power consumption. In the prior art, if the switching frequency of the LRA driver is insufficient, power loss is unavoidable, unless explicit LC filters are used, which and add extra cost and occupy a large area on the printed circuit board. By adapting the switching frequency to the LRA, external LC filters are unnecessary.

Due to the intrinsic low pass filtering in an LRA's electromechanical system, a switching frequency is used that is high enough to provide a desired degree of attenuation with acceptable switching losses. For a given application, an optimum point may be found that achieves a desired balance between attenuation and switching losses. For example, suppose an LRA has a resonant frequency of 200 Hz. The switching frequency may be selected to be several decades higher, e.g. 20 kHz, or 200 kHz.

In one approach, the switching frequency is selected to be above an effective "cutoff frequency" of the LRA 102. In particular, plotting the frequency response (e.g. amplitude of acceleration) of the LRA 102 with respect to frequency, the switching frequency may be above a frequency at which the frequency response falls at least X dB below the highest value of the frequency response below that frequency. The value of X may be greater than or equal to 10 in some embodiments. In other embodiments, X may be greater than or equal to 40.

Note that this frequency response is measured without the use of additional filtering components, such as an LC filter and therefore is the inherent frequency response of the LRA itself. This filtering reduces energy loss due to ripple in the sinusoidal input to the LRA 102 caused by the switching frequency the LRA driver 112. In prior approaches, using a separate LC circuit is used to perform this function, which adds significant expense and size, particularly due to the size of the inductor L of the LC circuit.

Figure 4:
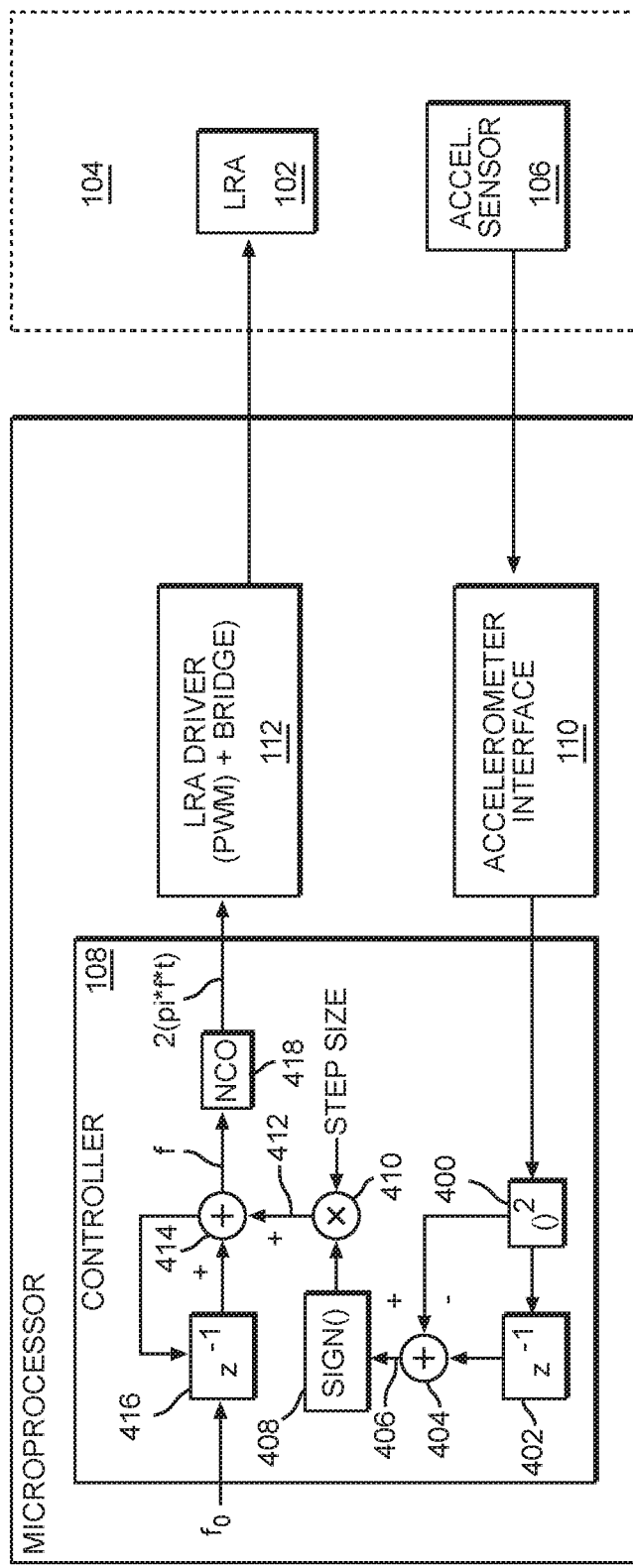
FIG. 4 is a detailed view of components implementing an LRA driver in accordance with an embodiment of the present invention.

Referring to FIG. 4, to increase the haptic efficiency of the LRA 102, defined as magnitude of acceleration divided by input power, the drive frequency must be closer to the resonant frequency of the LRA 102, preferably within <1 Hz. Mismatch between the two will reduce acceleration or vibration strength of the LRA. To get the most strength with the least power, the controller 108 adapts the drive frequency to match the resonance of the LRA 102. This can be done with a feedback controller that makes fine adjustments to frequency to increase the vibration magnitude. An initial frequency $f_0$ can be determined according to manufacturer specifications, or with a fast acquisition loop through a fast sweep of a wide range of frequencies, e.g. using linear or logarithmically swept chirp signals, or through common step or impulse response estimation techniques.

FIG. 4 illustrates an example of a feedback controller that may be used to adjust the initial frequency $f_0$ according to feedback from the accelerometer 106. The illustrated feedback circuit may be implemented using actual circuits or using a general purpose processor configured to perform the functions ascribed to the components of the illustrated feedback circuit. The feedback circuit may operate at an evaluation frequency, i.e. the functions described will be executed for each period of the evaluation frequency.

An output of the accelerometer interface 110 is input to a magnitude calculating unit 400. The magnitude calculating unit 400 calculates a metric of the magnitude of acceleration measured by the accelerometer 106. For example, where multiple accelerometers oriented along multiple axes are included in the accelerometer 106, the magnitude of the resultant vector represented by the combination of the measurements along the axes may be calculated. This magnitude may further be integrated over time to obtain an average magnitude, e.g. using the root mean square (RMS) approach. For example, where the LRA 102 is driven at a current drive frequency, the RMS value of the magnitude of the acceleration over one or more periods of the current drive frequency may be calculated as the magnitude metric. The RMS value of the magnitude over a period of the evaluation frequency may be used as the magnitude metric.

In other approaches, a peak detector may be used to detect peaks in the magnitude of the output of the accelerometer 106. The peak value in a period of time, such as one or more periods of the drive frequency, may be used as the metric of the magnitude. The peak value over a period of the evaluation frequency may be used.

The accelerometer 106 may be subject to other accelerations, such as movement of a person wearing a fitness tracking device incorporating the accelerometer 106. Accordingly, the output of the accelerometer 106 may be filtered prior to calculating the magnitude metric. For example, a bandpass filter including the initial frequency $f_0$. The bandwidth of the filter may be on the order of 10-1000 Hz. The LRA 102 is typically very sensitive to variation in frequency, so the band of possible frequencies may be small.

The output of the magnitude calculating unit 400 is the magnitude metric and the magnitude calculating unit 400 may calculate the magnitude periodically, such as for every period of the evaluation frequency. The evaluation frequency may be much smaller than the current drive frequency f of the LRA 102, e.g. smaller by a multiple between 0.5 and 1. In other embodiments, it is even smaller, such as by a multiple of 0.1 and 0.5.

Each magnitude metric value is input to a delay element 402 and a summer 404 that sums the magnitude metric with the negative of the output of the delay element 402. The delay element 402 outputs the value of the magnitude metric for a previous period of the evaluation frequency. Accordingly, the summer 404 outputs the difference between the most recent value of the magnitude metric with the previous value for the magnitude metric.

A sign evaluator 408 determines a sign of the output 406. This sign is then input to a multiplier 410 along with a step size to obtain a frequency increment 412. The value of step size is a predetermined parameter and may be selected to specify how finely the frequency can be tuned. Since a 1 Hz deviation is significant, the step size may be selected to be a fraction of a Hz, such as a value between 0.1 and 0.001 Hz. This frequency increment 412 is then input to a summer 414 along with the output of a delay element 416. The delay element 416 takes as an input the output of the summer 404 and provides as its output the output of the summer 414 ($f$) from the previous period of the evaluation frequency.

The output f of the summer is the current drive frequency. The current value of f is input to a numerically controlled oscillator (NCO) 418 that outputs a sine wave of frequency f (e.g., sin(2*pi*f*t), where t is time. The sine wave may be a digital approximation of a sine wave that is input to the LRA driver 112. Alternatively, the value of f may be input to the LRA driver 112 as a value that is then used to program the LRA driver 112 to generate a PWM signal approximating a sine wave of frequency f.

Note that when the value of f changes, the change may be input to the NCO 418 at a point in time when the amplitude of the sine wave output by the NCO 418 is at or near zero (e.g. within 5 percent of the peak amplitude of the NCO 418) in order to reduce discontinuities.

The value of f is initially set to the initial frequency $f_0$, which may be determined as described above. The value of f may then be controlled by the feedback control circuit as follows for each period of the evaluation frequency ("the subject period"):

i) Measure the value of the magnitude for the subject period.

ii) If the magnitude metric for the subject period is less than the magnitude metric for the evaluation period preceding the subject period, the output 406 of the summer 404 is negative. The value of step size will therefore be subtracted from a value of f for the previous evaluation period. This will decrease the value of f input to the NCO, thereby reducing the drive frequency for the LRA 102.

iii) If the magnitude metric for the subject period is greater than the magnitude metric for the evaluation period preceding the subject period, the output 406 of the summer 404 is positive. The value of step size will therefore be added to a value of f for the previous evaluation period. This will increase the value of f input to the NCO 418, thereby increasing the drive frequency for the LRA 102.

Note that this is one example of an algorithm for providing feedback and searching for a drive frequency that provides an increased value for the magnitude metric relative to other possible values tested. Accordingly, any approach to optimization or feedback control may be used to select the value of f in order to compensate for variation in the behavior of the LRA 102. In particular, the resonant frequency of the LRA 102 may vary over time due to factors such as temperature, orientation, pressure, or the like. Likewise, the resonant frequency of the LRA 102 may not be known with precision due to variation in an oscillating mass in the LRA or variation in manufacturing tolerances for other components of the LRA. The approach described herein enables compensation for this variation.

One advantage of the feedback control described above is that many devices will already incorporate an accelerometer. For example, a fitness tracker may include an accelerometer in order to track the wearer's movement. Accordingly, the outputs of the accelerometer may also be processed by the controller 108 or another processing device in order to perform fitness tracking or other functions. For example, the output of the accelerometer 106 may be processed to obtain a step count, distance traveled, intensity of exercise, amount of time spent sitting, or any fitness tracking function that is based on an accelerometer output as known in the art.

Where the accelerometer 106 is incorporated into a device performing fitness tracking, other types of sensors may be incorporated and used, such as a heart rate monitor, skin conductivity sensor, thermometer, or the like.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the embodiments discussed above may comprise computer hardware, software, firmware, or any combination thereof to perform at least a portion of their functions. For example, the embodiments may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
   an accelerometer;
   a linear resonant actuator (LRA) mechanically connected to the accelerometer; and
   a controller coupled to the accelerometer and the LRA and programmed to drive the LRA according to an output of the accelerometer;
   wherein the controller is programmed to:
   (a) increment a current drive frequency;
   (b) drive the LRA according to the current drive frequency;
   (c) compare a first magnitude of acceleration as measured by the accelerometer while the LRA was driven according to the current drive frequency to a second magnitude of acceleration as measured by the accelerometer while the LRA was driven according to a previous value of the current drive frequency;
   (d) if the first magnitude is greater than the second magnitude, repeat from (a); and
   (e) if the first magnitude is less than the second magnitude, decrement the current drive frequency and repeat from (b).

2. The apparatus of claim 1, wherein the LRA and the accelerometer are mounted to a first circuit board.

3. The apparatus of claim 2, wherein the controller is mounted to a second circuit board different from the first circuit board.

4. The apparatus of claim 1, wherein the controller is programmed to:
   measure variation in magnitude of acceleration as measured by the accelerometer with respect to frequency; and
   select a drive frequency for the LRA in accordance with the variation in magnitude.

5. The apparatus of claim 1, wherein the controller is further programmed to select an initial value for the current drive frequency by driving the LRA according to a range of frequencies and selecting the initial value according to a frequency of the range of frequencies for which a magnitude of acceleration as measured by the accelerometer was largest relative to other frequencies of the range of frequencies.

6. The apparatus of claim 1, further comprising a pulse width modulation (PWM) driver coupled to the controller and the LRA, the controller being programmed to cause the PWM driver to input a series of pulses approximating a sine wave having the current drive frequency into the LRA.

7. The apparatus of claim 6, further comprising a half bridge circuit, the PWM driver being coupled to the LRA through the half bridge circuit.

8. The apparatus of claim 6, wherein a switching frequency of the PWM driver is greater than a cut off frequency of the LRA.

9. An apparatus comprising:
an accelerometer;
a linear resonant actuator (LRA) mechanically connected to the accelerometer; and
a controller coupled to the accelerometer and the LRA and programmed to drive the LRA according to an output of the accelerometer;
wherein the controller is further programmed to perform a fitness tracking function according to the output of the accelerometer.

10. A method comprising:
providing an accelerometer;
providing a linear resonant actuator (LRA);
coupling vibration of the LRA to the accelerometer;
controlling, by a controller coupled to the accelerometer and the LRA, drive input to the LRA according to an output of the accelerometer; and
performing by the controller:
  (a) incrementing a current drive frequency;
  (b) driving the LRA according to the current drive frequency;
  (c) comparing a first magnitude of acceleration as measured by the accelerometer while the LRA was driven according to the current drive frequency to a second magnitude of acceleration as measured by the accelerometer while the LRA was driven according to a previous value of the current drive frequency;
  (d) when the first magnitude is greater than the second magnitude, repeat from (a); and
  (e) when the first magnitude is less than the second magnitude, decrement the current drive frequency and repeat from (b).

11. The method of claim 10, wherein coupling vibration of the LRA to the accelerometer comprises mounting the LRA and the accelerometer to a first circuit board.

12. The method of claim 11, wherein the controller is mounted to a second circuit board different from the first circuit board.

13. The method of claim 10, further comprising, by the controller:
measuring variation in magnitude of acceleration as measured by the accelerometer with respect to frequency; and
selecting a drive frequency for the LRA in accordance with the variation in magnitude.

14. The method of claim 10, further comprising, by the controller:
selecting an initial value for the current drive frequency by driving the LRA according to a range of frequencies and selecting the initial value according to a frequency of the range of frequencies for which a magnitude of acceleration as measured by the accelerometer was largest relative to other frequencies of the range of frequencies.

15. The method of claim 10, further comprising:
generating, by a pulse width modulation (PWM) driver, a series of pulses approximating a sine wave at the current drive frequency; and
inputting the series of pulses into the LRA.

16. The method of claim 15, further comprising:
inputting the series of pulses into the LRA through a half bridge circuit.

17. The method of claim 15, wherein a switching frequency of the PWM driver is greater than a cut off frequency of the LRA.

18. A method comprising:
providing an accelerometer;
providing a linear resonant actuator (LRA);
coupling vibration of the LRA to the accelerometer;
controlling, by a controller coupled to the accelerometer and the LRA, drive input to the LRA according to an output of the accelerometer; and
performing, by the controller, a fitness tracking function according to the output of the accelerometer.

* * * * *